United States Patent
Velummylum et al.

(10) Patent No.: US 10,108,955 B1
(45) Date of Patent: Oct. 23, 2018

(54) METERING COSTS OF AGGREGATED STORAGE

(75) Inventors: Piragash Velummylum, Seattle, WA (US); Johanna S. Olson, Bellevue, WA (US); Korwin J. Smith, Seattle, WA (US); James H. Wood, Seattle, WA (US); Wenlin Ma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 368 days.

(21) Appl. No.: 13/046,928

(22) Filed: Mar. 14, 2011

(51) Int. Cl.
G06Q 20/00 (2012.01)
G06Q 20/36 (2012.01)
G06Q 20/38 (2012.01)

(52) U.S. Cl.
CPC ....... *G06Q 20/3674* (2013.01); *G06Q 20/382* (2013.01)

(58) Field of Classification Search
USPC .......................................................... 705/52
See application file for complete search history.

(56) References Cited

U.S. PATENT DOCUMENTS

| | | | |
|---|---|---|---|
| 2005/0081009 A1* | 4/2005 | Williams ................ | G06F 3/061 711/163 |
| 2009/0292930 A1* | 11/2009 | Marano et al. ............... | 713/189 |
| 2011/0126168 A1* | 5/2011 | Ilyayev ......................... | 717/103 |
| 2011/0307947 A1* | 12/2011 | Kariv ...................... | H04L 63/08 726/9 |
| 2012/0005584 A1* | 1/2012 | Seago ..................... | G06F 11/32 715/738 |
| 2012/0078948 A1* | 3/2012 | Darcy ............... | G06F 17/30197 707/769 |
| 2012/0130873 A1* | 5/2012 | Morgan ......................... | 705/34 |

* cited by examiner

*Primary Examiner* — John W Hayes
*Assistant Examiner* — John M Winter
(74) *Attorney, Agent, or Firm* — Thomas | Horstemeyer, LLP

(57) ABSTRACT

Disclosed are various embodiments of a file service which meters costs associated with aggregated file storage. A separate storage area is created for each of a plurality of cost center managers. A default storage area is created that is not associated with any of the cost center managers. Each storage area is divided into a plurality of logical partitions. Each logical partition corresponds to a content user. A content user is allowed to access a file in the corresponding logical partition of the corresponding storage area.

24 Claims, 5 Drawing Sheets

METERING COSTS OF AGGREGATED STORAGE

BACKGROUND

File servers may map a file system across multiple drives using technologies such as redundant arrays of inexpensive disks (RAID), network file systems, and/or other technologies. Storage on such file servers may incur significant costs.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a file service that separates the file system from the storage service, allowing files for a particular user to be stored in any location and to be moved without the user's knowledge. Through a file access application, the file service provides the user with a single object view of his files, so that the files appear to be in one location. Though a user only sees his own files, the file service may actually aggregate files of different users into the same storage location.

The file service also divides the aggregated storage into cost-center specific storage areas to facilitate cost tracking. Costs can be metered and tracked on a per-user basis. Costs associated with a user's file storage and/or access are reported by the file service to a cost center manager that is associated with the file. Access to such information allows a cost center such as a business unit to choose whether to charge the costs to some or all customers, or the business unit may choose to subsidize the cost itself. In the following discussion, a general description of the system and its components is provided, followed by a discussion of the operation of the same.

Figure 1:
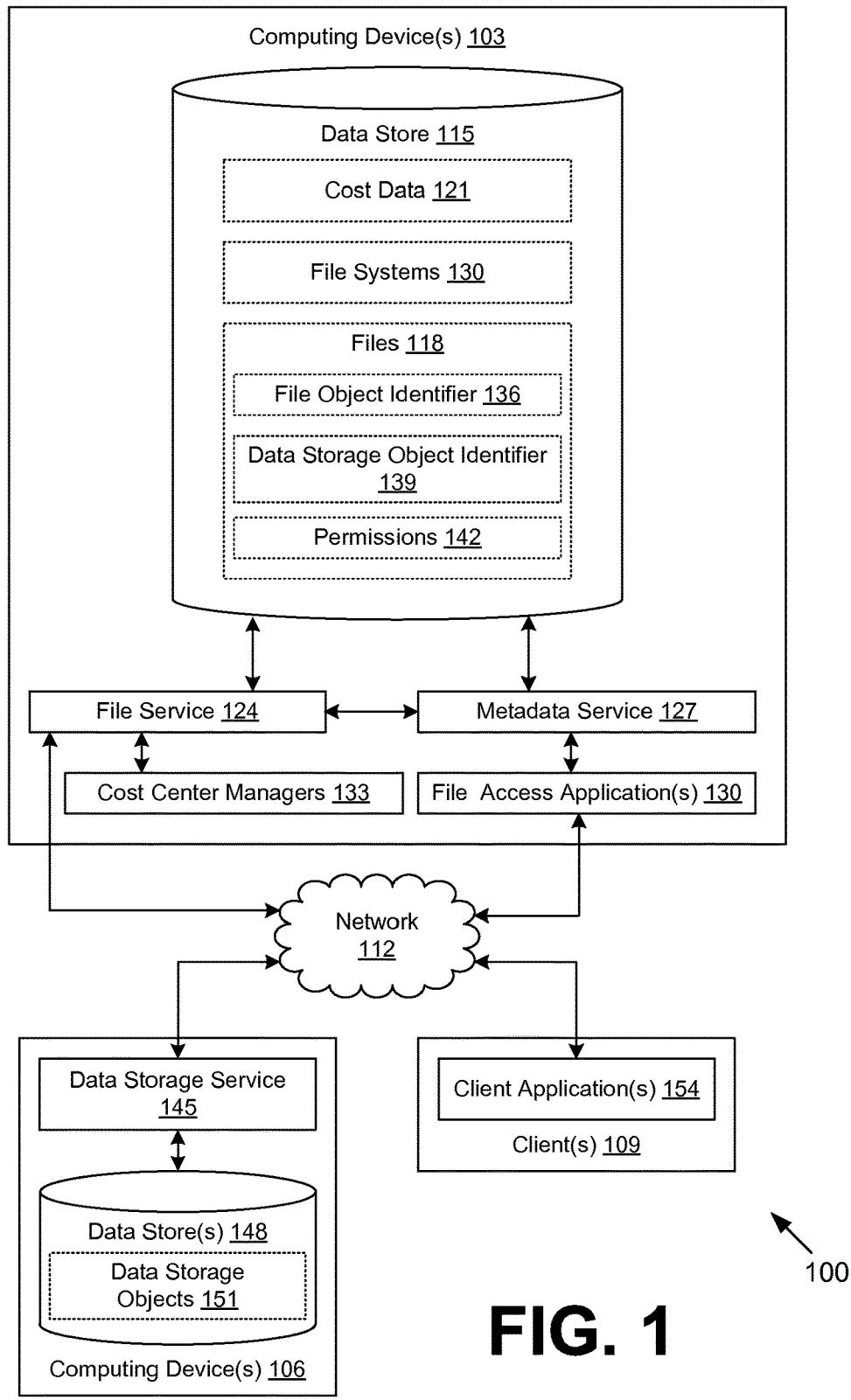
FIG. 1 is a drawing of a networked environment according to various embodiments of the present disclosure.

With reference to FIG. 1, shown is a networked environment 100 according to various embodiments. The networked environment 100 includes one or more computing devices 103, one or more computing devices 106, and one or more clients 109, in data communication by way of a network 112. The network 112 includes, for example, the Internet, intranets, extranets, wide area networks (WANs), local area networks (LANs), wired networks, wireless networks, or other suitable networks, etc., or any combination of two or more such networks.

A computing device 103 and a computing device 106 may comprise, for example, a server computer or any other system providing computing capability. Alternatively, a plurality of computing devices 103 or computing devices 106 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 or computing devices 106 may be located in a single installation or may be distributed among many different geographical locations. For purposes of convenience, each of the computing devices 103 and each of the computing devices 106 is referred to herein in the singular. Even though such devices are referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below. The data store 115 includes, for example, files 118 and cost data 121, and may also include various other types of data.

The components executed on the computing device 103, for example, include a file service 124, a metadata service 127, one or more file access applications 130, and one or more cost center managers 133. The components executed on the computing device 103 may also include other applications, services, processes, systems, engines, or functionality not discussed in detail herein.

The file service 124 provides a logical file hierarchy that is maintained within the computing device 103 on behalf of one or more content users. In various embodiments, the logical file hierarchies maintained by the file service 124 are abstractions that do not directly correspond to any particular physical storage arrangements such as disk drives, portable storage media, etc.

The file service 124 provides access to one or more files 118 using various data stored in the data store 115. The files 118 may represent various forms of content accessed by and/or consumed by a user, for example, digital media, documents, etc. Data associated with a file 118 may include a file object identifier 136, a data storage object identifier 139, one or more permissions 142, and/or other data.

The file object identifier 136 corresponds to a number, character string, or other identifier that uniquely identifies the file 118 to the file service 124. In one embodiment, the file object identifier 136 may include a uniform resource identifier (URI). The data storage object identifier 139 corresponds to a reference that may identify a data storage object associated with the file 118 that is stored in a data store managed by a data storage service. In one embodiment, the data storage object identifier 139 may include a key value for obtaining the data storage object. The data store from which to obtain the data storage object may be determined implicitly or explicitly, for example, from a definition in the data storage object identifier 139. The data storage object identifier 139 is decoupled from the file object identifier 136, so that changes to the data storage object identifier 139 do not affect the file object identifier 136. In some embodiments, the file object identifier 136 refers to a row in a metadata table, and the data storage object identifier 139 is an attribute of the table, so that the table can be used to map a file object identifier 136 to its corresponding data storage object identifier 139.

The permissions 142 in the data store 115 may correspond to access permissions and security policies associated with the file 118. For example, a user may be designated as the file owner, and a group of users may be designated as a file group. In such an example, read or write access may be enabled or disabled as it applies to the user, the group of users, and/or all users. For the purposes of the permissions 142, an application may be considered to be a user. The granularity of the permissions 142 may also vary among different embodiments.

It is noted that the various data associated with the files 118 used by the file service 124 need not be recorded in inodes, vnodes, file allocation tables, or any other data structure associated with physical file systems. In various embodiments, the data associated with the files 118 may be maintained as data within a relational database management system (RDBMS) or similar database management system.

The metadata service 127 may maintain one or more searchable indices of metadata items so that files 118 can be quickly and easily located without having to examine all of the underlying data storage objects maintained by the file service 124. In one embodiment, the metadata service 127 may support a structured query language (SQL)-style "select" statement for the purpose of searching and obtaining metadata items according to query criteria.

The file access applications 130 correspond to hosted applications that may allow content users to browse, access, and/or transfer the files 118 to/from the file service 124. Various file access applications 130 may, for example, have a web-based interface and may serve up network pages, such as web pages or other forms of network content, to facilitate user interaction. Other file access applications 130 may be internal applications and may not have a web-based interface. Non-limiting examples of file access applications 130 may include a photo organizing tool, a music file organizer, a music playback tool, a word processor, a spreadsheet, an email application, and so on.

Storage of, and access to, the files 118 managed by the file service 124 incurs a cost. This may be an explicit cost, or may be an indirect cost measured in terms of resources. A file 118 may be associated with a particular cost center manager 133, in which case file system activity for that file is tracked by the file service 124 and the associated costs are metered and stored as cost data 121.

The cost data 121 are then reported to the associated cost center manager 133. The cost data 121 may be provided on an individual file basis, or may be aggregated by content user. In some embodiments, each cost center corresponds to a business unit or product line which is internal to the entity which provides the content users with the file service 124. Such a unit may provide content to users for storage by the file service 124. As one example, a digital music business unit may allow content users to purchase digital music and store the music on the file service 124. As another example, a personal document business unit may allow content users to create word processing documents, spreadsheets, etc., and store the documents on the file service 124. In other embodiments, the cost centers are external entities rather than internal business units.

A cost center may pay the costs itself, may pass the costs on to a content user, or some combination thereof. For example, business units may choose to provide free storage to some content users but not others, to provide a limited amount of free storage to all content users, to subsidize the costs for some or all users, or combinations thereof. Decisions such as these can be facilitated by the cost center managers 133 using cost data 121 provided by the file service 124.

The components executed on the computing device 106, for example, include a data storage service 145 and may also include other applications, services, processes, systems, engines, or functionality not discussed in detail herein. The data storage service 145 is executed to provide access to store and retrieve data from the data store 148. The data stored in the data store 148 includes, for example, data storage objects 151 and potentially other data. The data storage objects 151 correspond to the data stored for the files 118. Such data may be any type of data storage object, such as, for example, text data, binary data, multimedia data, and so on. The data storage service 145 may store and retrieve data based upon a unique identifier such as a key, which may be a character string, number, or other identifier.

As described herein, the file service 124 and the data storage service 145 are decoupled. The file service 124 does not store the files 118 itself. The files 118 are instead stored by the data storage service 145, which in some embodiments is geographically remote from the file service 124. The data storage service 145 may employ a utility computing model so that the storage capacity itself is geographically dispersed. The file service 124 operates to abstract the underlying storage layer so that users of the data storage service 145, for example the file service 124 and content users, have no need for knowledge as to how data is actually being stored. For example, content users may not know on what disk drives, in what computing device 106, in what data center, etc., that their data is being stored. In various embodiments, a content user may be able to specify performance characteristics or types of hardware to be used in storing the data.

The client 109 is representative of a plurality of client devices that may be coupled to the network 112. The client 109 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, an electronic book reader, or other devices with like capability.

The client 109 may be configured to execute various applications such as a client application 154 and/or other applications. The client application 154 is executed to store, retrieve, process, and otherwise use files 118 in one or more managed by the file service 124 in the computing device 103. In one embodiment, the client application 154 corresponds to a browser application that renders network pages provided by the computing device 103 that facilitate interaction with the file service 124, and/or the file access applications 130. In one embodiment, the client application 154 is integrated with an operating system of the client 109 to provide access to the file service 124 in a manner similar to any mounted file system of the client 109. The client 109 may be configured to execute applications beyond client application 154 such as, for example, browser applications, email applications, instant message applications, and/or other applications.

Next, a general description of the operation of the various components of the networked environment 100 is provided. To begin, a content user may transfer files to the file service 124 by way of the client application 154 and/or the file access applications 130. Such a transfer may involve the user uploading a file from the client 109 to the computing device 103. In other cases, a user may purchase a file (e.g., a music file) from an online retailer associated with the computing device 103, and the file may be automatically saved in the file service 124 by way of a file access applications 130. When a file is transferred to the file service 124, the file service 124 creates a file 118 and generates a file object identifier 136. The file service 124 interacts with the data storage service 145 to store a data storage object 151 corresponding to the data associated with the source file in the data store 148. A data storage object identifier 139 corresponding to the stored data storage object 151 is then recorded for the file 118.

Once content has transferred to the file service 124, the user may also perform various file-related operations such as, for example, renaming, copying, moving, deleting, recycling, uploading, downloading, and so on. When a file 118 is moved with the hierarchy presented by the file service 124, the file 118 or file object identifier 136 may be updated, without any changes to the underlying data storage object(s) 151. Similarly, when a change is made concerning where the underlying data storage objects 151 are stored, the file 118 or file object identifier 136 may remain unchanged. When a file 118 is deleted, data storage object(s) 151 may be removed if no other files 118 point to the data storage object(s) 151.

Figure 2:
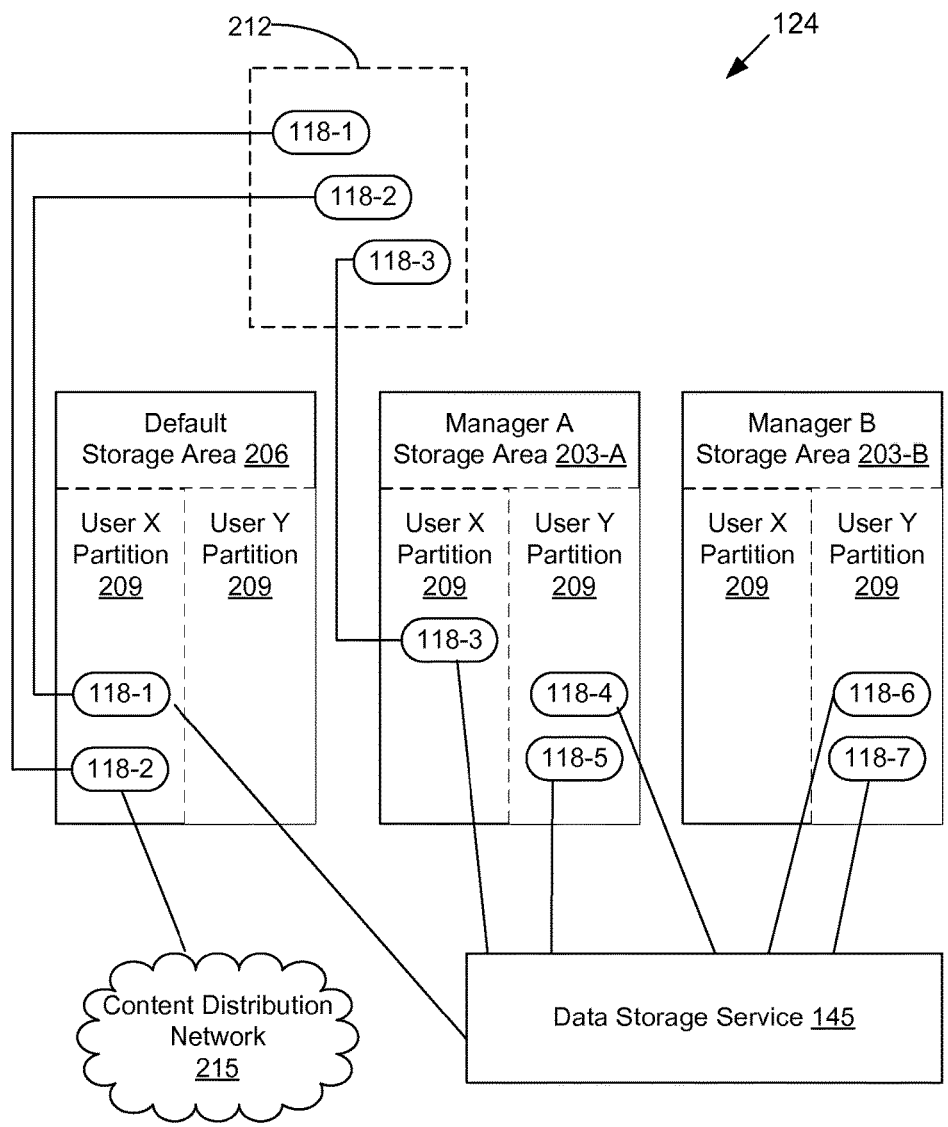
FIG. 2 is a block diagram illustrating an example of functionality implemented as portions of a file service executed in a computing device in the networked environment of FIG. 1 according to various embodiments of the present disclosure.

With reference now to FIG. 2, shown is a block diagram illustrating a portion of the operation of the file service 124 (FIG. 1), and data structures used thereby, according to some embodiments. When a content user transfers a file 118 into the file service 124, the file service 124 determines the cost center manager 133 that is associated with the file 118. If a cost center manager 133 is found, then the file service 124 places the file 118 in a manager-specific storage area 203 within the data storage service 145. As explained above, the cost center manager 133 is provided with cost information for file access, and may use this information to charge these costs to the customer. The cost center manager 133 that is associated with a file 118 may be determined, for example, based on file type, on user-specific information maintained by the file service 124, on information provided by the user during the file transfer, or combinations thereof. The user-specific information may be, for example, account information, purchase history, file transfer activity, or other such data.

If no cost center manager 133 is found in association with the file 118, then the file service 124 places the file 118 into a default storage area 206 and costs associated with the file 118 are not metered. In some embodiments, although other components of the networked environment 100 may perform tracking and/or monitoring of files 118 in the default storage area 206.

Each manager-specific storage area 203 is further divided, logically, into user-specific partitions 209. The default storage area 206 is also divided into user-specific partitions user-specific partitions 209. This division facilitates the tracking of file activity and associated costs on a per-user basis. After determining whether a manager-specific storage area 203 or the default storage area 206 is appropriate, the file service 124 places the file 118 in the appropriate user-specific partition 209. The user-specific partitions 209 may be logically, rather than physically, partitioned by, for example, a permission model using policies. The user that is associated with a file 118 is determined from information provided during the file transfer. For example, as part of the file process, the user may first request from the file service 124 a uniform resource locator (URL), where the URL provided by the file service 124 encodes the user identity and/or the content manager identity.

The example scenario shown in FIG. 2 involves seven files and two users, X and Y. The file service 124 uses two manager-specific storage areas, 203-A and 203-B, as well as the default storage area 206. Two of X's files are stored in the default storage area 206, within the user-specific partition 209: files 118-1 and 118-2. The remaining file for user X, 118-3, is stored in the user-specific partition 209 of the default storage area 206. Two files for user Y, files 118-4 and 118-5, are stored in the user-specific partition 209 of manager-specific storage area 203-A. The remaining two files for user Y, 118-6 and 118-7, are stored in the user-specific partition 209 of the manager-specific storage area 203-B.

Even though the files 118 are placed into different logical storage areas and user partitions, the file service 124 nonetheless provides a single object view to a content user. Thus, in the example scenario of FIG. 2, user X sees view 212, with his three files, but does not see files belonging to user Y. In some embodiments, the single object view provided by the file service 124 does provide any differentiating information to the user, so the user is unaware that files are associated with different content managers and thus stored in different storage areas. In other embodiments, the single object view provides some information about the content manager associated with the files 118. For example, single object view may visually distinguish between a video file that was rented by the content user, which may be stored in a storage area 203 for the video-on-demand business unit, and a video file that was purchased by the user, which may be stored in the default storage area 206.

Actual storage of the files 118 is handled by the data storage service 145 rather than by the file service 124. In some embodiments, a file 118 may be stored by a content distribution network 215. In the example scenario shown in FIG. 2, the files 118-1, 118-3, 118-4, and 118-5 reside with the data storage service 145 while the file 118-2 resides in the content distribution network 215. The content distribution network 215 may use a single copy of a file 118 to stream content to multiple content users. On request by a content user that has obtained the appropriate rights (e.g., by purchasing or renting the digital media), the file service 124 may provide a reference, such as a Uniform Resource Locator (URL), to the single copy located in the content distribution network 215. The URL may be chosen so that the streaming source is located geographically proximate to the content user, to reduce latency and improve performance.

Figure 3:
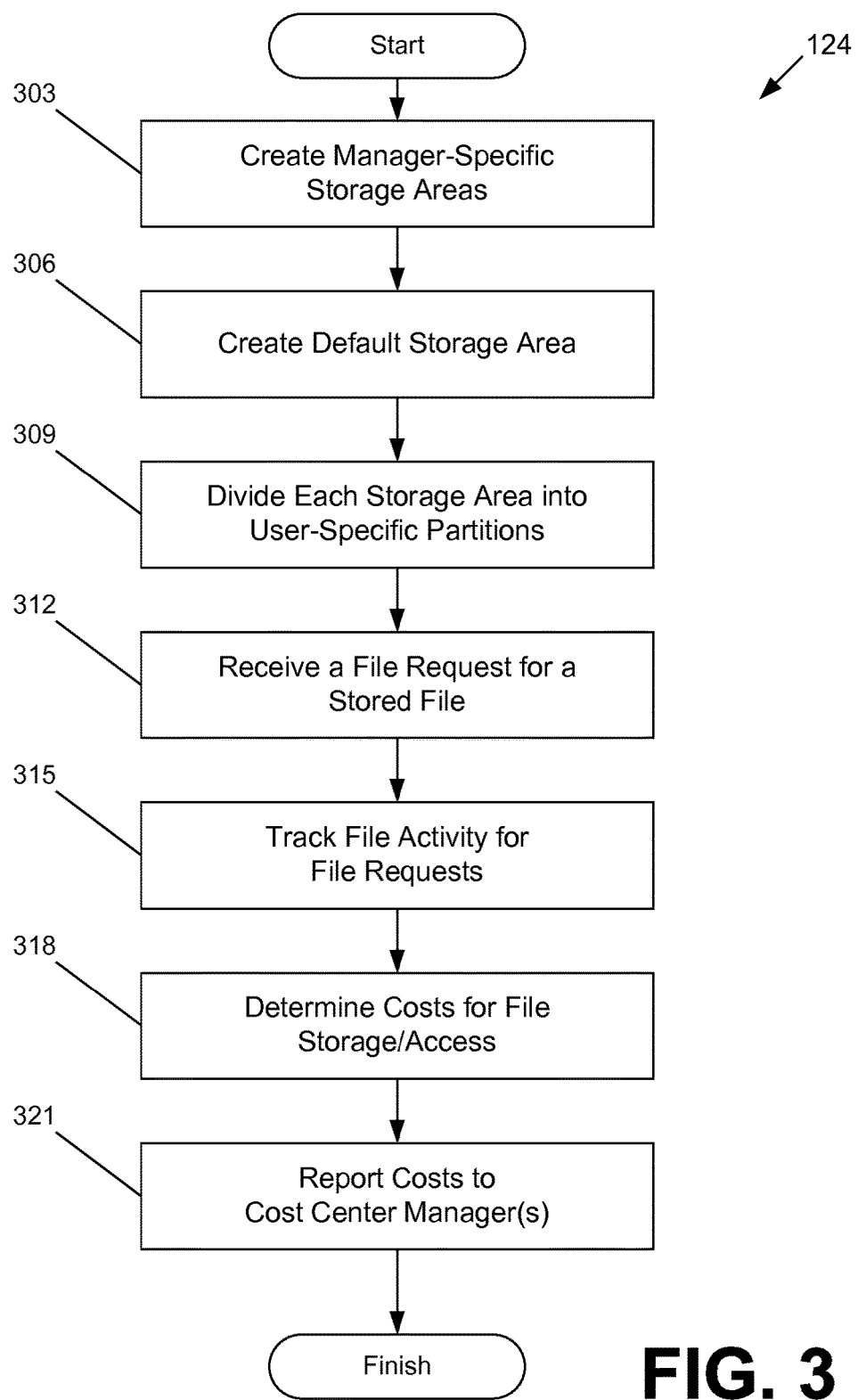
FIG. 3 is a flowchart illustrating an example of functionality implemented as portions of a file service executed in a computing device in the networked environment of FIG. 1 according to various embodiments of the present disclosure.

With reference now to FIG. 3, shown is a flowchart that provides one example of the operation of a portion of the file service 124 (FIG. 1) according to various embodiments. It is understood that the flowchart of FIG. 3 provides merely an example of the many different types of functional arrangements that may be employed to implement the operation of the portion of the file service 124 as described herein. As an alternative, the flowchart of FIG. 3 may be viewed as depicting an example of steps of a method implemented in the file service 124.

Beginning at box 303, the file service 124 creates a separate storage area 203 for each of a number of cost center managers 133 (FIG. 1). As noted above in connection with FIG. 2, each cost center may correspond to a business unit or product line which is internal to the entity which provides the file service 124. The manager-specific storage areas 203 may be created at the same time, or may be added individually at a later time as the business evolves and grows, so that new business units can take advantage of the functionality provided by the file service 124. Next, at box 306 the file service 124 creates a default storage area 206 (FIG. 2), which is not associated with any cost center manager 133.

At box 309 the file service 124 divides each of the storage areas and the default storage area 206 into multiple partitions 209, each corresponding to a content user. A content user may be, for example, a customer of services provided by the file service 124. Partitions 209 may be added and deleted as the customer base of file service 124 changes. Partitions 209 may be of different sizes at creation, though a default size may be used. A customer-specific partition 209 may grow, shrink, and change over time. As explained earlier, the storage areas reside not with the file service 124 but instead with the data store 148.

In some embodiments, the user-specific partitions 209 may be logical partitions that are implemented using policies which allow a user to access only particular files. For example, the policy may specify that the user is restricted to files that have a URI prefix "manager_a\<customer_id>\"

Next, at box 312 the file service 124 receives, from one of the content users, a file request relating to a file 118 (FIG. 1) located in the user's logical partition of one of storage areas. The storage area may be either a manager-specific storage area 203 or the default storage area 206. The storage area 203 or 206 that is associated with a file 118 may be determined, for example, based on file type, on user-specific information maintained by the file service 124, on information provided by the user during the file transfer, or combinations thereof. Thus, although user storage is aggregated within the data store 148 used by the file service 124, the file service 124 allows each content user to access a file in the appropriate user-specific 209 of the appropriate manager-specific storage area 203.

At box 315 the file service 124 tracks any file activity resulting from requests received at box 312. The information tracked may include, for example, the file identifier, the content user, the cost center, the file type, and/or the type of access. Next, at box 318 the file service 124 uses the file activity information to compute various costs allocated to storage and/or access of the monitored files 118. At box 321 the file service 124 reports the costs to the cost center(s). The report may break down individual access and/or storage costs and/or provide a total cost. Costs may be reported per-user for a specific period of time. The report may be generated periodically, or may be provided at the request of a cost center. In this manner, the storage is aggregated, but usage can be tracked on a per-user basis and reported to the appropriate cost center. Boxes 303-321 may be repeated to process changes to the number and/or identity of cost center managers and content users, and to process additional file requests from users and requests for reports from cost center managers.

Figure 4:
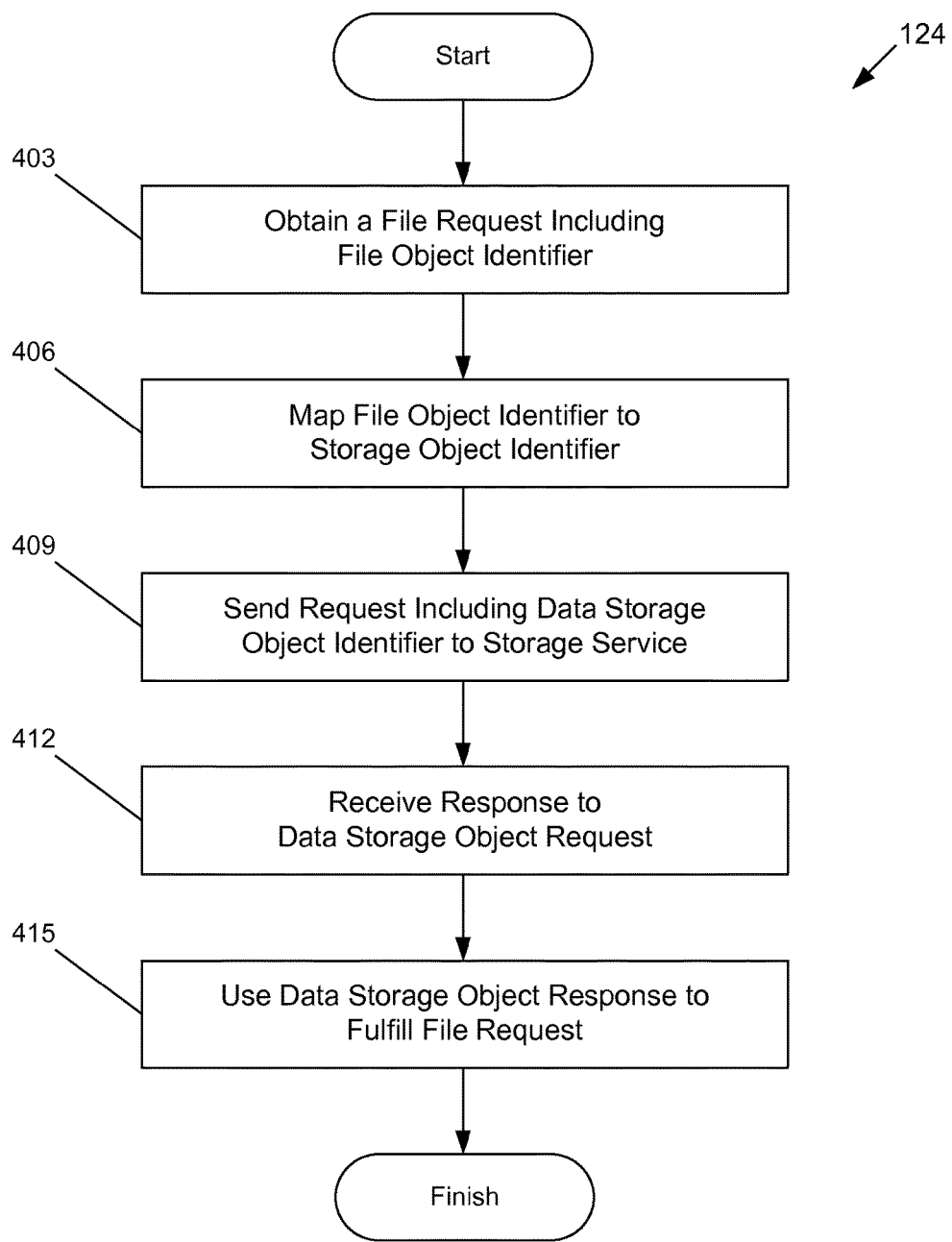
FIG. 4 is a flowchart illustrating another example of functionality implemented as portions of a file service executed in a computing device in the networked environment of FIG. 1 according to various embodiments of the present disclosure.

Turning now to FIG. 4, shown is a flowchart that provides another example of the operation of a portion of the file service 124 (FIG. 1) according to various embodiments. It is understood that the flowchart of FIG. 4 provides merely an example of the many different types of functional arrangements that may be employed to implement the operation of the portion of the file service 124 as described herein. As an alternative, the flowchart of FIG. 4 may be viewed as depicting an example of steps of a method implemented in the file service 124.

Beginning at box 403, the file service 124 obtains, from a content user, a request to access a file 118 (FIG. 1) located in the user's logical partition of one of the storage areas. The storage area 203 or 206 that is associated with a file 118 may be determined, for example, based on file type, on user-specific information maintained by the file service 124, on information provided by the user during the file transfer, or combinations thereof. The file request received at box 403 includes a file object identifier 136 (FIG. 1) which uniquely identifies the file 118 to the file service 124, and may take the form, for example, of a uniform resource identifier (URI).

At box 406, the file service 124 maps the file object identifier 136 to the corresponding data storage object identifier 139 (FIG. 1), which uniquely identifies the storage location for the file 118 within the data storage service 145 (FIG. 1). Having obtained the data storage object identifier 139, at box 409 the file service 124 sends a request including the identified data storage object to the data storage service 145. Later, at box 412 the file service 124 receives a response to the data storage object request. At box 415 the file service 124 uses information in the response to fulfill the original file request received at box 403. Boxes 403-415 may be repeated to process additional file requests from users.

Before fulfilling a file request from a content user, the file service 124 may verify that the user has permission by comparing information in the file request to a policy. If the policy indicates that the requested access is not permitted, the file request is denied and this denial is communicated to the content user.

Figure 5:
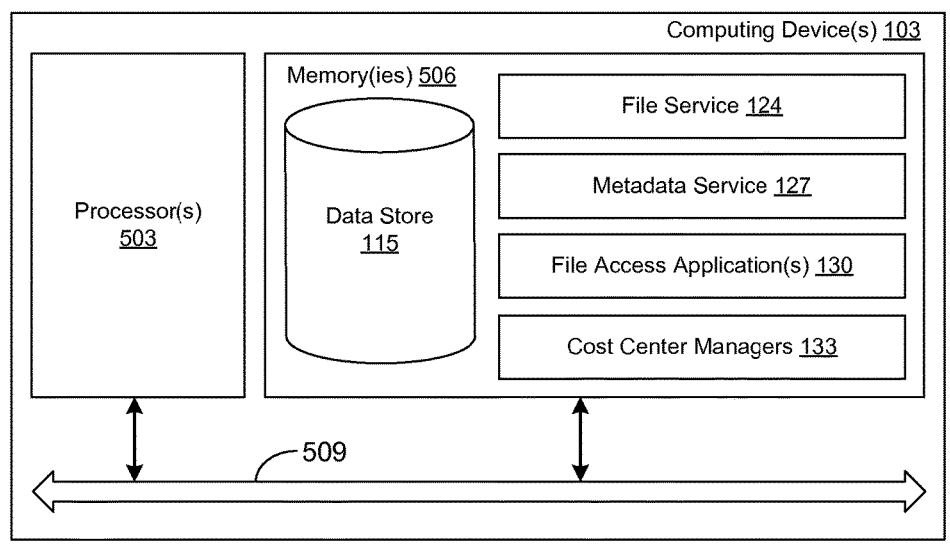
FIG. 5 is a schematic block diagram that provides one example illustration of a computing device employed in the networked environment of FIG. 1 according to various embodiments of the present disclosure.

Moving on to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the file service 124, the metadata service 127, the file access applications 130, the cost center managers 133, and potentially other applications. Also stored in the memory 506 may be a data store 115 and other data. In addition, an operating system may be stored in the memory 506 and executable by the processor 503. While not illustrated, the computing device 106 and the client 109 (FIG. 1) also include components like those shown in FIG. 5, whereby the data storage service 145 and the client application 154 (FIG. 1) are stored in a memory and executable by a processor.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 112 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the file service 124 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-4 show the functionality and operation of an implementation of portions of the file service 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4 show a specific order of execution, it is understood that the order of execution may differ from that which is depicted. For example, the order of execution of two or more blocks may be scrambled relative to the order shown. Also, two or more blocks shown in succession in flowcharts of FIGS. 3-4 may be executed concurrently or with partial concurrence. Further, in some embodiments, one or more of the blocks shown in FIGS. 3-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the file service 124, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the Therefore, the following is claimed:

1. A computer-implemented method comprising:
   storing, via a computing device, a plurality of metered files that are metered for cost in a metered storage area of a storage service, the metered storage area being partitioned to include a plurality of metered logical partitions, each metered logical partition of the metered storage area being user specific, wherein a respective metered logical partition corresponds to a respective user of a plurality of users and stores a subset of the plurality of metered files that correspond to the respective user;
   storing, via the computing device, a plurality of unmetered files that are not metered for cost in an unmetered storage area of the storage service, the unmetered storage area being partitioned to include a plurality of unmetered logical partitions, each unmetered logical partition of the unmetered storage area being user specific, wherein a respective unmetered logical partition corresponds to the respective user and stores a subset of the plurality of unmetered files that correspond to the respective user;
   generating, via the computing device, a plurality of user interfaces corresponding to the plurality of users, wherein a respective user interface of the plurality of user interfaces aggregates a plurality of files from the respective metered partition and the respective unmetered partition together in a single object view of files that correspond to the respective user, the plurality of files comprising the subset of the plurality of metered files and the subset of the plurality of unmetered files;
   tracking, via the computing device, a usage by the respective user of a metered file of the plurality of metered files based at least in part on the metered file being stored in the respective metered logical partition;
   tracking, via the computing device, a metered cost associated with the usage of the metered file;
   obtaining, via the computing device, a request to access at least one file of the plurality of files, the request including at least one file object identifier that is associated with the at least one file; and
   sending, via the computing device, a data object request including at least one data object identifier to the storage service in response to mapping the at least one file object identifier to the at least one data object identifier.

2. The computer-implemented method of claim 1, further comprising receiving a request to store the metered file in metered storage area.

3. The computer-implemented method of claim 1, wherein the usage comprises file access.

4. The computer-implemented method of claim 1, wherein the usage comprises file storage.

5. The computer-implemented method of claim 1, wherein the metered cost is defined by at least one content usage policy.

6. The computer-implemented method of claim 1, wherein the metered cost comprises a cost of storage of the metered file.

7. The computer-implemented method of claim 1, wherein the metered cost comprises a cost of bandwidth when accessing the metered file.

8. The computer-implemented method of claim 1, further comprising reporting the metered cost to a cost center manager.

9. The computer-implemented method of claim 1, wherein the respective user interface of the plurality of user interfaces is generated for display on a client computing device associated with the respective user.

10. The computer-implemented method of claim 1, further comprising controlling access to the metered file using a permission model.

11. A system comprising:
    a data store configured to store at least specific computer-executable instructions; and
    at least one device comprising a hardware processor and in communication with the data store, the at least one device configured to execute the specific computer-executable instructions to at least:
      store a plurality of metered files that are metered for cost in a plurality of separate storage areas of the data store, each storage area of the plurality of separate storage areas associated with a cost center manager of a plurality of cost center managers, each storage area being partitioned into a plurality of metered partitions that are user specific, wherein a respective metered partition corresponds to a respective user of a plurality of users and stores a subset of the plurality of metered files that correspond to the respective user;
      store a plurality of unmetered files that are not metered for cost in a default storage area of the data store, the default storage area being partitioned to include a plurality of unmetered partitions that are user specific, wherein a respective unmetered partition corresponds to a respective user of a plurality of users and stores a subset of the plurality of unmetered files that correspond to the respective user; and
      generate a plurality of user interfaces, wherein a respective user interface aggregates the subset of the plurality of metered files and the subset of the plurality of unmetered files together in a single object view of files that correspond to the respective user.

12. The system of claim 11, wherein the at least one device is further configured to execute the specific computer-executable instructions to at least store a metered file in a particular storage area of the plurality of separate storage areas based at least in part upon a particular cost center manager of the plurality of cost center managers in response to a request from the at least one of the plurality of users.

13. The system of claim 11, wherein a metered cost for subset of the plurality of metered files is defined by a content usage policy, and wherein usage of the subset of the plurality of metered files is tracked for the respective user of the plurality of users based at least in part on the respective metered partition.

14. The system of claim 11, wherein the usage comprises file access.

15. The system of claim 11, wherein the usage comprises file storage.

16. The system of claim 11, wherein a metered cost for each of the plurality of metered files is defined by a content usage policy.

17. The system of claim 11, wherein a metered cost for the plurality of metered files comprises a cost of storage of the subset of the plurality of metered files.

18. The system of claim 11, wherein a metered cost for the plurality of metered files comprises a cost of bandwidth when accessing the subset of the plurality of metered files.

19. The system of claim 11, wherein the at least one device is further configured to execute the specific computer-executable instructions to at least report a metered cost for the plurality of metered files to the cost center manager of the plurality of cost center managers.

20. The system of claim 11, wherein the respective user interface of the plurality of user interfaces is generated for display on a computing device associated with the respective user of the plurality of users.

21. The system of claim 11, wherein the at least one device is further configured to execute the specific computer-executable instructions to at least control access using a permission model to the subset of the plurality of metered files.

22. The computer-implemented method of claim 1, wherein the subset of the plurality of metered files is associated with a cost center manager of a plurality of cost center managers and stored in a metered storage area of the plurality of metered storage areas based at least in part on a file type of the metered file.

23. The computer-implemented method of claim 1, wherein the subset of the plurality of metered files is associated with a cost center manager of a plurality of cost center managers and stored in a metered storage area of the plurality of metered storage areas based at least in part on data associated with the respective user.

24. A non-transitory computer-readable medium embodying a program executable in a computing device, the program, when executed, causing the computing device to:

store a plurality of files in a plurality of storage areas of a storage service, the plurality of storage areas comprising an unmetered storage area that is not metered for cost and a plurality of metered storage areas that are metered for cost, a respective metered storage area of the plurality of metered storage areas corresponding to a business unit of a plurality of business units, each of the plurality of storage areas being partitioned into user-specific partitions comprising a plurality of metered partitions for each respective metered storage area and a plurality of unmetered partitions for the unmetered storage area, wherein a respective metered partition stores a metered subset of the plurality of files that correspond to a respective user of a plurality of users and a respective unmetered partition stores an unmetered subset of the plurality of files that correspond to the respective user;

track a usage cost associated with usage of at least one of the plurality of files by the respective user, the at least one of the plurality of files being stored in at least one of the plurality of metered storage areas, wherein the usage cost is based at least in part on a content usage policy of a plurality of content usage policies associated with the at least one of the plurality of metered storage areas in which the at least one of the plurality of files is stored;

generate a respective user interface of a plurality of user interfaces corresponding to the plurality of users, wherein the respective user interface aggregates the metered subset and the unmetered subset of the plurality of files that correspond to the respective user together in a single object view of files that correspond to the respective user; and report, for the respective user, the usage cost associated with the at least one of the plurality of metered storage areas to at least one of the plurality of business units.

\* \* \* \* \*